(12) United States Patent
Sherman et al.

(10) Patent No.: US 11,381,281 B2
(45) Date of Patent: Jul. 5, 2022

(54) FAST DATA TRANSMISSION FOR WIRELESS POWER TRANSFER SYSTEMS

(71) Applicant: POWERMAT TECHNOLOGIES LTD, Petach Tikva (IL)

(72) Inventors: Itay Sherman, Hod-Hasharon (IL); Elieser Mach, Rosh Tzurim (IL)

(73) Assignee: POWERMAT TECHNOLOGIES LTD., Petach Tikva (IL)

( * ) Notice: Subject to any disclaimer, the term of this patent is extended or adjusted under 35 U.S.C. 154(b) by 0 days.

(21) Appl. No.: 17/165,306

(22) Filed: Feb. 2, 2021

(65) Prior Publication Data

US 2021/0242907 A1 Aug. 5, 2021

Related U.S. Application Data

(60) Provisional application No. 62/969,684, filed on Feb. 4, 2020.

(51) Int. Cl.
| | | |
|---|---|---|
| *H02J 50/80* | (2016.01) | |
| *H04B 5/00* | (2006.01) | |
| *H02J 50/12* | (2016.01) | |
| *H04L 25/02* | (2006.01) | |

(52) U.S. Cl.
CPC ............ *H04B 5/0037* (2013.01); *H02J 50/12* (2016.02); *H02J 50/80* (2016.02); *H04B 5/0031* (2013.01); *H04L 25/0212* (2013.01)

(58) Field of Classification Search
CPC ........ H02J 50/12; H02J 50/80; H04B 5/0031; H04B 5/0037; H04L 25/0226

USPC .......................................... 307/104; 455/41.1
See application file for complete search history.

(56) References Cited

U.S. PATENT DOCUMENTS

| | | | |
|---|---|---|---|
| 6,320,901 B1* | 11/2001 | Arad | H04L 27/2647 708/305 |
| 7,079,613 B2 | 7/2006 | Birru | |
| 9,385,787 B2 | 7/2016 | Toivanen et al. | |
| 10,164,469 B1* | 12/2018 | Jadidian | H02J 50/90 |
| 2002/0181567 A1 | 12/2002 | Hamdi | |
| 2007/0165755 A1* | 7/2007 | Jong | H04B 17/327 375/346 |
| 2009/0149130 A1 | 6/2009 | You et al. | |
| 2011/0122666 A1 | 5/2011 | Teggatz et al. | |
| 2016/0315754 A1* | 10/2016 | Wu | H04L 5/0062 |
| 2018/0034506 A1 | 2/2018 | Moore et al. | |
| 2019/0132061 A1* | 5/2019 | Xin | H04J 13/0014 |
| 2019/0238000 A1 | 8/2019 | Salvekar et al. | |

OTHER PUBLICATIONS

Extended European Search Report dated Jun. 18, 2021 for European Patent Application No. 21155275.7.
Chinese Office Action dated Apr. 6, 2022 for Chinese Patent Application No. 202110156970.0.

* cited by examiner

*Primary Examiner* — William Hernandez
(74) *Attorney, Agent, or Firm* — Volpe Koenig

(57) ABSTRACT

A power receiver is provided herein. The power receiver provides in-band communication with a power transmitter. The power receiver recognizes a change in frequency that identifies a training sequence and determines an impulse response with respect to the training sequence. The power receiver also cancels an effect of the impulse response during the in-band communication.

18 Claims, 10 Drawing Sheets

TABLE 800

| Bit # | Bit Value Measured time delta (in samples) | Stored D index |   |
|---|---|---|---|
| 0 | 0 | 702 | |
| 1 | 0 | 702 | |
| 2 | 0 | 702 | |
| 3 | 0 | 702 | |
| 4 | 0 | 702 | 00000=0 |
| 5 | 1 | 718 | 00001=1 |
| 6 | 0 | 706 | 00010=2 |
| 7 | 0 | 703 | 00100=4 |
| 8 | 1 | 717 | 01001=9 |
| 9 | 0 | 706 | 10010=18 |
| 10 | 1 | 719 | 00101=5 |
| 11 | 1 | 722 | 01011=11 |
| 12 | 0 | 707 | 10110=22 |
| 13 | 0 | 702 | 01100=12 |
| 14 | 1 | 717 | 11001=25 |
| 15 | 1 | 712 | 10011=19 |
| 16 | 1 | 722 | 00111=7 |
| 17 | 1 | 723 | 01111=15 |
| 18 | 1 | 722 | 11111=31 |
| 19 | 0 | 706 | 11110=30 |
| 20 | 0 | 706 | 11100=28 |
| 21 | 0 | 705 | 11000=24 |
| 22 | 1 | 718 | 10001=17 |
| 23 | 1 | 722 | 00011=3 |
| 24 | 0 | 707 | 00110=6 |
| 25 | 1 | 718 | 01101=13 |
| 26 | 1 | 721 | 11011=27 |
| 27 | 1 | 722 | 10111=23 |
| 28 | 0 | 706 | 01110=14 |
| 29 | 1 | 718 | 11101=29 |
| 30 | 0 | 705 | 11010=26 |
| 31 | 1 | 719 | 10101=21 |
| 32 | 0 | 705 | 01010=10 |
| 33 | 0 | 703 | 10100=20 |
| 34 | 0 | 701 | 01000=8 |
| 35 | 0 | 702 | 10000=16 |

FIG. 8

TABLE 900

| X C(X) | c(x) |
|---|---|
| 0000 | 710 |
| 0001 | 714 |
| 0010 | 711 |
| 0011 | 714.5 |
| 0100 | 709 |
| 0101 | 713.5 |
| 0110 | 710 |
| 0111 | 714.5 |
| 1000 | 710 |
| 1001 | 713.5 |
| 1010 | 710 |
| 1011 | 714.5 |
| 1100 | 711 |
| 1101 | 713 |
| 1110 | 712 |
| 1111 | 714 |

FIG. 9

FAST DATA TRANSMISSION FOR WIRELESS POWER TRANSFER SYSTEMS

BACKGROUND

The disclosure relates generally to wireless power transfer systems, and more specifically, to fast data transmission for wireless power transfer systems.

In general, in contemporary implementations of data communications, current wireless power transfer methods provide for in-band communication between a power transmitter (Tx) and a power receiver (Rx). For example, the Qi method uses load modulation for Rx to Tx data transfer and uses frequency modulation for Tx to Rx data transfer.

Current Tx data transfer rates are relatively low. For instance, as each data bit is sent over 512 power carrier cycles under the current wireless power transfer method. In this way, for a 128 kHz carrier frequency, current Tx data transfer rates yield a data rate of only 250 bps. These low Tx data transfer rates are intentionally low in part to avoid an inherent echo (e.g., an impulse response) that fluctuates between the Tx and Rx at higher data rates.

Recently, current wireless power transfer method provide authentication capabilities of Tx to Rx. Though, with these authentication capabilities, relatively large quantities of authentication data need to be transferred from Tx to Rx. Given the current Tx data transfer rates (which are relatively low), the exchange of authentication data takes considerable time and delays the authentication capabilities of Tx.

In some case, to accommodate these authentication capabilities, an approach to increase a data rate is to lower a number of cycles. Yet, when reducing the number of cycles, there is a point at which parasitic resonant behaviors (with respect to the Tx and Rx) prevail, thereby complicating bit decoding in a way that was not present when the number of cycles was a higher number.

Thus, there is a need to improve current wireless power transfer method.

SUMMARY

According to one embodiment, a power receiver is provided. The power receiver provides in-band communication with a power transmitter. The power receiver recognizes a change in frequency that identifies a training sequence and determines an impulse response with respect to the training sequence. The power receiver also cancels an effect of the impulse response during the in-band communication.

According to one or more embodiments, the power receiver embodiment above can be provided can be implemented as a system, a method, an apparatus, or a computer program product, along with as a power transmitter.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

FIG. 8 depicts a table in accordance with one or more embodiments;

FIG. 9 depicts a table in accordance with one or more embodiments; and

DETAILED DESCRIPTION

Embodiments disclosed herein may include apparatuses, systems, methods, and/or computer program products (generally discussed herein as a system) that provide for a power transmitter (Tx) that is capable of transmitting data at far higher bit rates than current wireless power transfer methods (e.g., up to a carrier frequency) and a power receiver (Rx) that is capable of decoding this data, such as by canceling any generated impulse responses.

One exemplary implementation provides a Rx that recognizes a change in frequency from the Tx (during in-band communications a higher bit rates) and determines an impulse response with respect to a training sequence. Note that the change in frequency can identify the training sequence. Note that the impulse response is extending over multiple bits due to the higher bit rates. In turn, the Rx cancels an effect of the impulse response during the in-band communication of data. Another example implementation may include a Tx using control error packets with value of 0 received from the Rx as a trigger for sending the data to the Rx. Another example implementation may include using a dedicated packet, where each packet includes a fixed preamble that is used for training an equalizer of the Rx.

According to one or more advantages, technical effects, and benefits, the system minimizes additional circuitry for the Tx and Rx and design cost for the Rx by maintaining a low complexity within the system receiver relative to current wireless power transfer method. For instance, the low complexity and improved bit rate are maintained through the training sequence detection and the impulse response determination, while addressing (and canceling) natural resonant behaviors (e.g., which also enables the system herein to be interleaved with other current wireless power transfer methods). Thus, embodiments described herein are necessarily rooted in one or more controllers of the Tx and Rx of the system to perform proactive operations to overcome problems specifically arising in the realm of in-band communications (e.g., by increasing data rates of bi-directional in-band communications) during wireless power transfer.

Figure 1:
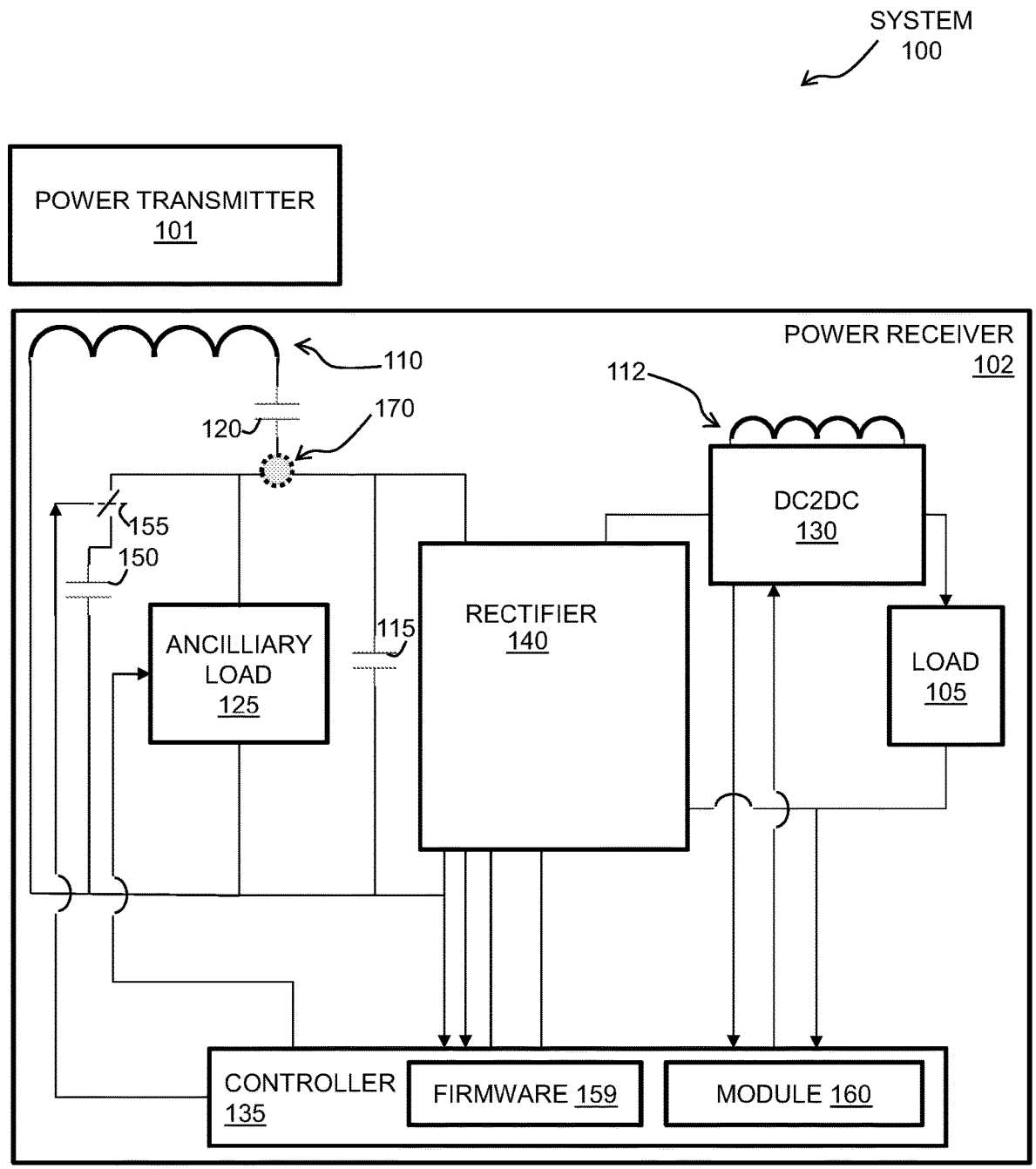
FIG. 1 shows a block diagram depicting a power receiver of a system in accordance with one or more embodiments.

FIG. 1 shows a block diagram depicting a system 100 in accordance with one or more embodiments. The system comprises a power transmitter 101 and a power receiver 102 (referred herein as Tx 101 and Rx 102, respectively). The Tx 101 is any device that can generate electromagnetic energy to a space around the Tx 101 that is used to provide power to the Rx 102. The Rx 102 is any device that can receive, use, and/or store the electromagnetic energy when present in the space around the Tx 101. For ease of explanation and brevity, the component focus of FIG. 1 is that of the Rx 102, while noting that the Tx 101 can have a similar or the same component structure as the Rx 102.

As shown in FIG. 1, the Rx 102 includes circuitry for receiving and storing the electromagnetic energy, such as a load 105. The circuitry of the Rx 102 may also include a resonance coil 110; a parallel resonance capacitor (capacitor) 115; a serial resonance capacitor (capacitor) 120; an ancillary load 125; a direct current to direct current converter (DC2DC) 130; a controller 135; and a rectifier 140. In accordance with some example embodiments, the Rx 102 may be used to wirelessly obtain induced power from the Tx 101 for supplying power to a load 105. For example, the Rx 102 may be used for charging the load 105, examples of which include handheld battery, a power supply, a combination thereof, and the like. Additionally, the Rx 102 may be capable of wirelessly communication with the Tx 101 (e.g., in-band communication). According to one or more embodiments, a resonate section (circuit) of the Rx 102 can include the coil 110 covered with ferrite, the capacitor 120, and the capacitor 115, a power-supply section of the Rx 102 can include the rectifier 140 and the DC2DC 130, and a control and communication section of the Rx 102 can include the controller 135 and the ancillary load 125.

The values of the resonance circuit components are defined to match with a transmitted frequency of the Tx 101. The Rx 102 can be provided with or without the capacitor 115. Additionally, or alternatively, the resonance circuit can further comprise at least one branch each having a tuning capacitor (rcap) 150 and a switch 155 controlled by the controller 135.

According to one or more embodiments, the controller 135 can include software therein (e.g., firmware 159) that logically provides a FIR equalizer, a detector of training sequence (e.g., loads data to the FIR equalizer), an analyzer of training sequence (e.g., that processes data), and an impulse response canceler (e.g., uses the FIR data to perform the canceling). In this regard, the controller 135 can have a system memory where software and a processor that executes the software in place to implement operations described herein. Further, the controller 135 can toggle the switch 155, of the at least one branch, to engage the branch rcap 150 as an additional parallel capacitor that can alter the resonance frequency of the resonance circuit, thus changing the operational point of the system 100.

The rectifier 140 of the power supply section can be utilized for converting AC voltage attained by the resonance circuit to DC voltage. The rectifier 140 can be based on commercially available half-wave rectification; full-wave rectification; controlled (e.g., field-effect transistor-based of FET based) full-wave rectification; and any combination thereof, or the like. According to one or more embodiments, the rectifier 140 can be any rectifier using one or more components, such as 4 diodes (e.g., asynchronous rectifier), 2 diodes and 2 FETs (half synchronous), 4FET (synchronous), or 2 capacitors and 2 switches, that are controlled by either a dedicated logic circuit or the controller 135 as depicted in FIG. 1.

According to one or more embodiments, the DC2DC 130, of the power supply section, can be utilized for adjusting output voltage and/or current, attained from the rectifier 140, to the load 105. According to one or more embodiments, the DC2DC 130 may be a DC-to-DC converter capable of stepping up its output voltage magnitude, above its input voltage, and/or stepping down its output voltage to almost zero. To do so the DC2DC utilizes inductor 112 used for both the stepdown mode and step-up mode. The DC2DC 130 can be based on the principles of a switched mode power supply having its output voltage vary, across a relatively large range. The output voltage of the DC2DC 130 can be regulated by varying frequency and duty-cycle of the DC2DC 130 switching, such as a switch mode power-supply, with a switching signal generated at controller 135.

Figure 2:
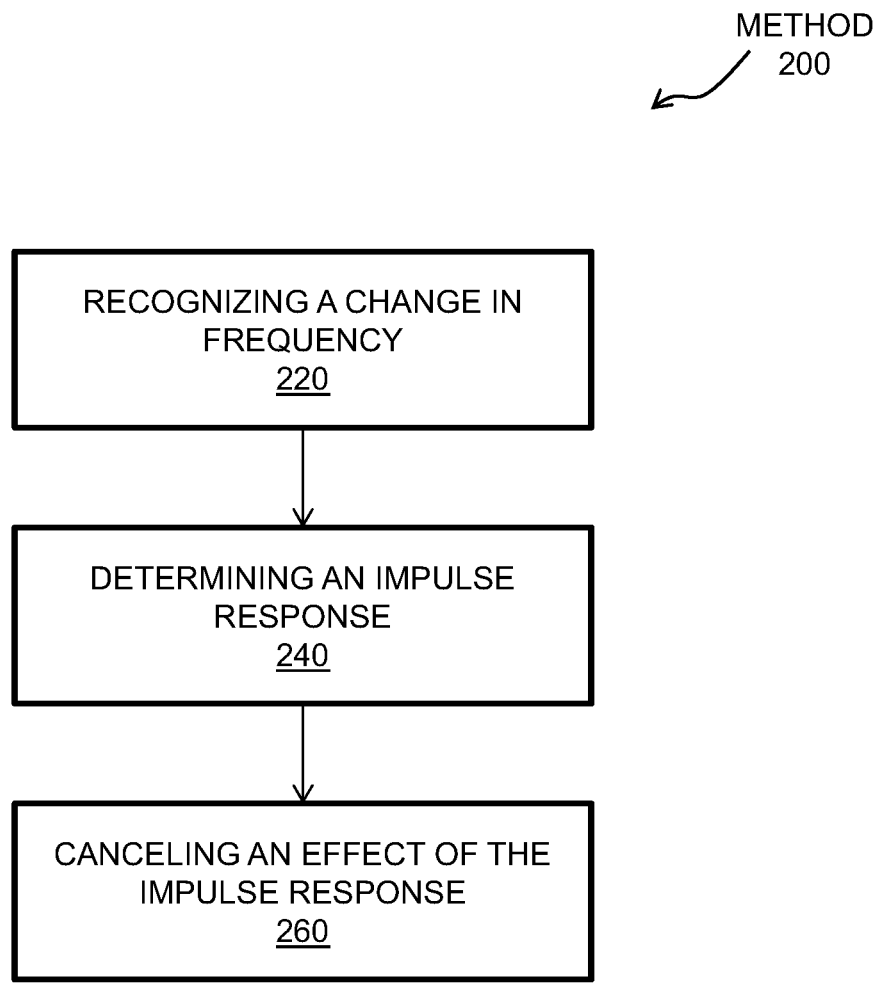
FIG. 2 depicts a method of a system in accordance with one or more embodiments.
Figure 3:
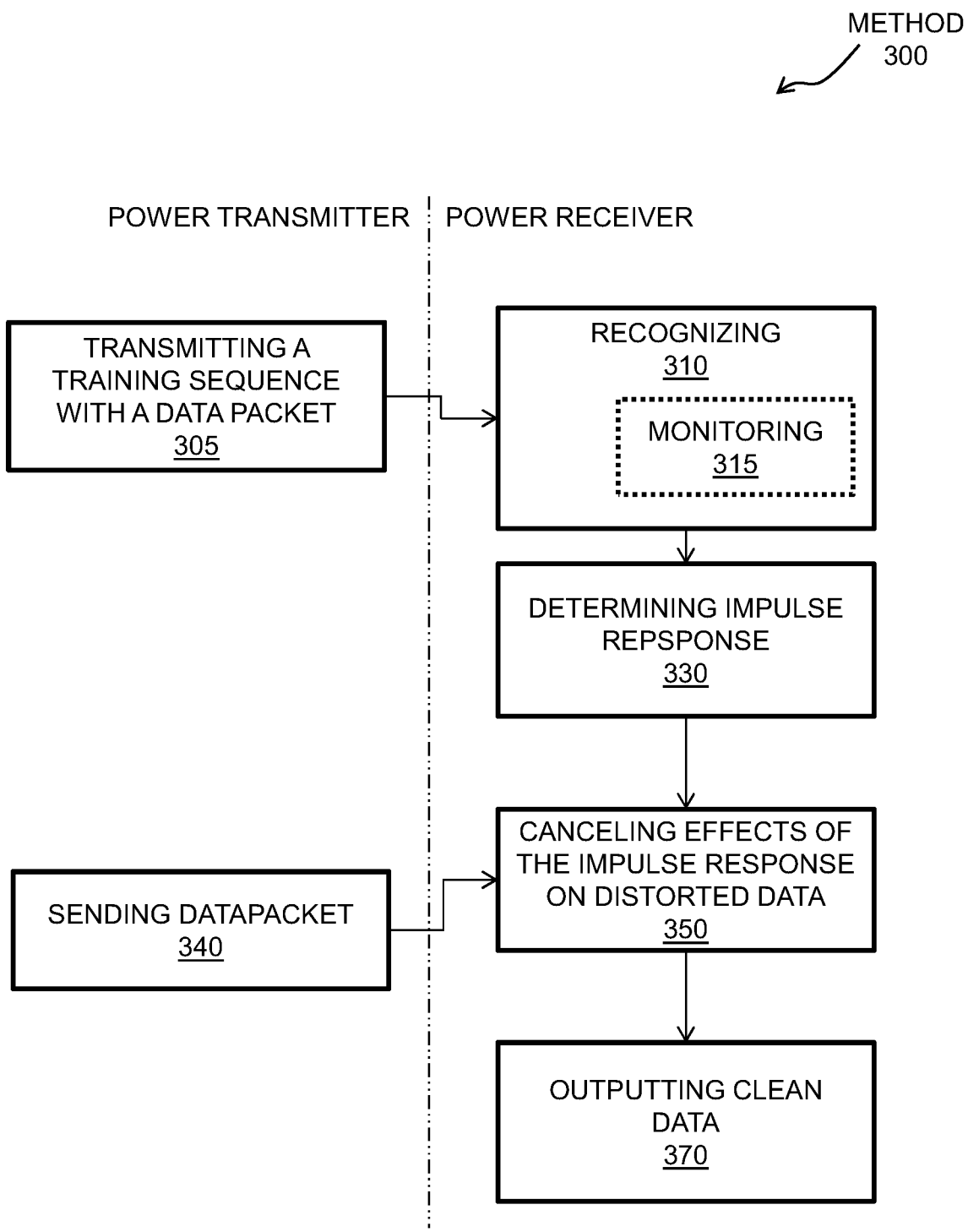
FIG. 3 depicts a method of a system in accordance with one or more embodiments.
Figure 5:
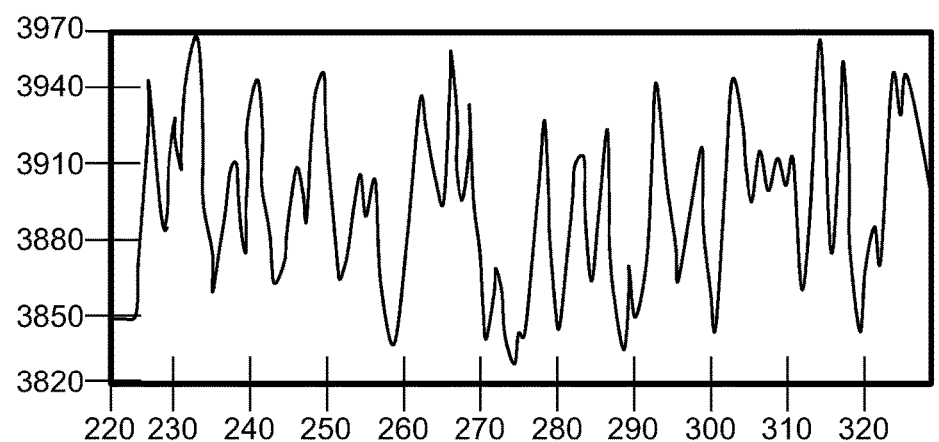
FIG. 5 shows a graph in accordance with one or more embodiments.
Figure 5:
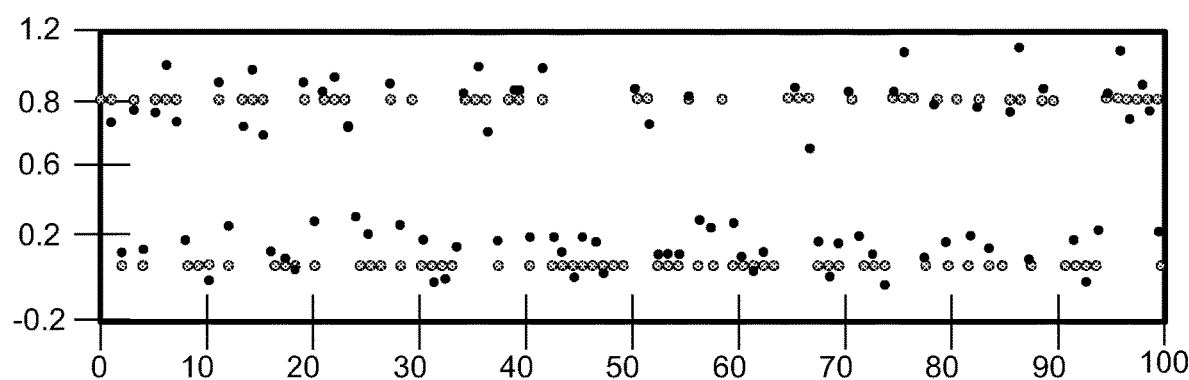

According to one or more embodiments, the controller 135 can be a computerized component or a plurality of computerized components adapted to perform methods such as depicted in FIGS. 2-3 and 5. The controller 135 can include a central processing unit (CPU) based on a microprocessor, an electronic circuit, an integrated circuit, implemented as special firmware ported to a specific device such as a digital signal processor, an application specific integrated circuit, and any combination thereof, or the like. The controller 135 can include a computer program product that stores a computer readable storage medium (e.g., implementing methods such as depicted in FIGS. 2-3 and 5). According to one or more embodiments, the controller 135 can be utilized to perform computations required by the Rx 102 or any of the circuitry therein.

The controller 135 may also comprise an input/output (I/O) module 160 utilized as an interface to transmit and/or receive information and instructions between the controller 135 and elements of the Rx 102, such as ancillary load 125; DC2DC 130; rectifier 140; at least one switch 155; and a wiring junction 170. According to one or more embodiments, the controller 135 can activate, through the I/O module 160, the ancillary load 125 with a signal that incapsulates information encoded by controller 135. The ancillary load 125 can be connected before or after rectifier 140. The signal may be configured to excites the ancillary load 125 in a way that impacts the coupling between the Rx 102 and the Tx 101, so a detection circuit of the Tx 101 can decode the information.

According to one or more embodiments, the controller 135 may sense, through the I/O module 160, the DC input voltage (Vin) and DC output voltage (Vout) of the DC2DC 130. The controller 135 can also sense a current (i) flowing from the DC2DC 130 to the load 105. Additionally, or alternatively, the controller can regulate the output voltage of the DC2DC 130 with a switching signal. According to one or more embodiments, the controller 135 can activate, through the I/O module 160, one or more switches of the at least one switch 155 to change the resonance frequency. By activating, with the at least one switch 155, the at least one capacitor (e.g., such as rcap 150) can be added in parallel to the resonance circuit, thus adding the equivalent capacitance of the at least one capacitor, which subsequently alters the resonance frequency.

According to one or more embodiments, controller 135 can cause the Rx 102 to participate in in-band communications with the Tx 101. In this regard, the controller 135 can determine/detect/sense at the wiring junction 170 one or more signals (e.g., values, losses, impulse responses, data, and other parameters). Note that additional location are contemplated by the system 100, such as the controller 135 can determine/detect/sense one or more signals with respect to a shunt resistor of the Rx 102. Accordingly, the controller 135 can utilize the one or more signals to receive in-band communication from the Tx 101, to perform digital signal processing on the in-band communication, and to the instruct the circuitry therein to respond to the Tx 101. Turning now to FIG. 2, an example operation of digital signal processing on the in-band communication is described.

FIG. 2 depicts a method 200 of a system (e.g., the system 100 of FIG. 1) in accordance with one or more embodiments. The method 200 can be executed by the controller 135 after the Rx 102 is presented to the Tx 101 in the space around the Tx 101, such that at least in-band communications of data at higher bit rates begin. Further, the method 200, generally, is an example operation of digital signal processing (e.g., receiving and decoding) by the controller 135 on data of the in-band communication, while canceling any generated impulse responses.

The method 200 begins at block 220, where the Rx 102 recognizes/detects a change in frequency (in the in-band communications). The change in frequency identifies a training sequence. According to one or more embodiments, the controller 135 of the Rx 102 can monitor the in-band communication to measure the frequency at the wiring junction 170. Based on this monitoring (e.g., the measured frequency), the controller 135 can infer the training sequence from an interval or use a threshold level (e.g., defined level stored in the controller 135). For example, the controller 135 can detect an interval between peaks (e.g., observations of the highest points) or a defined level of voltage of the capacitor 115 or 120 of the Rx 102 or the inductor 110 of the Rx 102 that correspond to the change in frequency. According to one or more embodiments, the training sequence within the data of the in-band communication can be sent by the Tx 101 every data packet. Further, the training sequence can be sent every two data packets or other number or combination of numbers to reduce the overhead within the in-band communication.

At block 240, the Rx 102 determines an impulse response with respect to the training sequence. For instance, the controller 135 performs digital signal processing using the training sequence of block 220 to determine the impulse response. The training sequence, whether single or multiple pulses, must be known to the Rx 102 in advance (e.g., stored in firmware on the computer readable storage medium of the controller 113, such as due to storage at manufacturing and/or due to prior in-band communication updates). Note that the impulse response is due to the higher bit rates of the in-band communication, and can be referred to illustratively as an echo of the data of the in-band communication. Due to this echo the data becomes distorted by the time the controller 135 receives it.

At block 260, the Rx 102 cancels an effect of the impulse response on the data (e.g., distorted data). That is, the impulse response is physically present such that all data bits sent from the Tx 101 are subject to this impulse response and gets distorted or smudged. In turn, the RX 102 cancels the effect by processing the distorted data. For example, the controller 135 performs digital signal processing on the distorted data received through the in-band communication, using the impulse response determined from the training sequence, to remove the effect of the impulse response on the data. In this way, the controller 135 produces clean data from distorted data.

The method 200 can be continuous and/or loop, such that the controller 135 dynamically determines one or more impulse responses corresponding to one or more data packets received after one or more training sequences and cancels the effects of the one or more impulse responses within one or more distorted data packets. In this way, the system 100 and method 200 can address any echo, even if the echo is not stable due to a changing load (e.g., send the packet, learn a relative echo, and cut that echo). According to one or more embodiments, a similar approach to method 200 can be extended to support an increase in a data rate of transmissions from the Rx 102 to the Tx 101.

Turning now to FIG. 3, an example operation of a method 300 of a system (e.g., the system 100 of FIG. 1) is depicted in accordance with one or more embodiments. The method 300 can be executed by the Rx 102 and the Tx 101 after the Rx 102 is presented to the Tx 101 in the space around the Tx 101, such that at least in-band communications of data at higher bit rates begins. As those in FIG. 3, some operations of the method 300 are executed by the Tx 101, which others are executed by the Rx 102.

The method 300 begins at block 305, wherein the Tx 101 transmits a training sequence with a data packet. The Tx 101 can transmit at a frequency range of 120 kHz to 150 kHz. A controller of the Tx 101 uses pulse width modulation (PWM) signal to create a power carrier signal and can modulate a frequency when a data bit is to be sent. The Tx 101 can transmit the training sequence based on a trigger from Rx 102 as described herein (e.g., the Tx 101 sends data in response to Control Error 0 packets sent from Rx 102 or a dedicated packet.

For instance, the Tx 102 sends a training pulse or combination of known pulses, as the training sequences, to the Rx 102. According to one or more embodiments, the Tx 101 selects an operation frequency of 128 kHz of the transmission. Then, the Tx 101 particularly provides a change in the operation frequency in the in-band communications to signal that the training sequence is being sent (e.g., identify the training sequence). In an example, the change in the operation frequency includes sending a training pulse that is composed of a single carrier cycle (e.g., one carrier cycle length) at a frequency that is 3 kHz higher than current operating frequency.

At block 310, the Rx 102 recognizes a change in frequency (in the in-band communications). The change in frequency (e.g., the operating frequency) identifies the training sequence. As part of the recognizing the change in the frequency, at block 315, the Rx 102 can monitor a carrier cycle length based on intervals between peaks of voltage of the capacitor 115 or 120, the inductor 110 on the receiver resonance circuit, or based on zero crossing intervals. According to one or more embodiments, the controller 135 can utilize the control signals for the half or full synchronous rectifier FETs to measure time intervals between transitions. In some embodiments, the training of finite impulse response (FIR) response is performed before each data packet transmission or before a block of packets. In another embodiment, the training is performed periodically at sated (e.g., at any value along a range from 100 msec to 5 sec).

Figure 4:
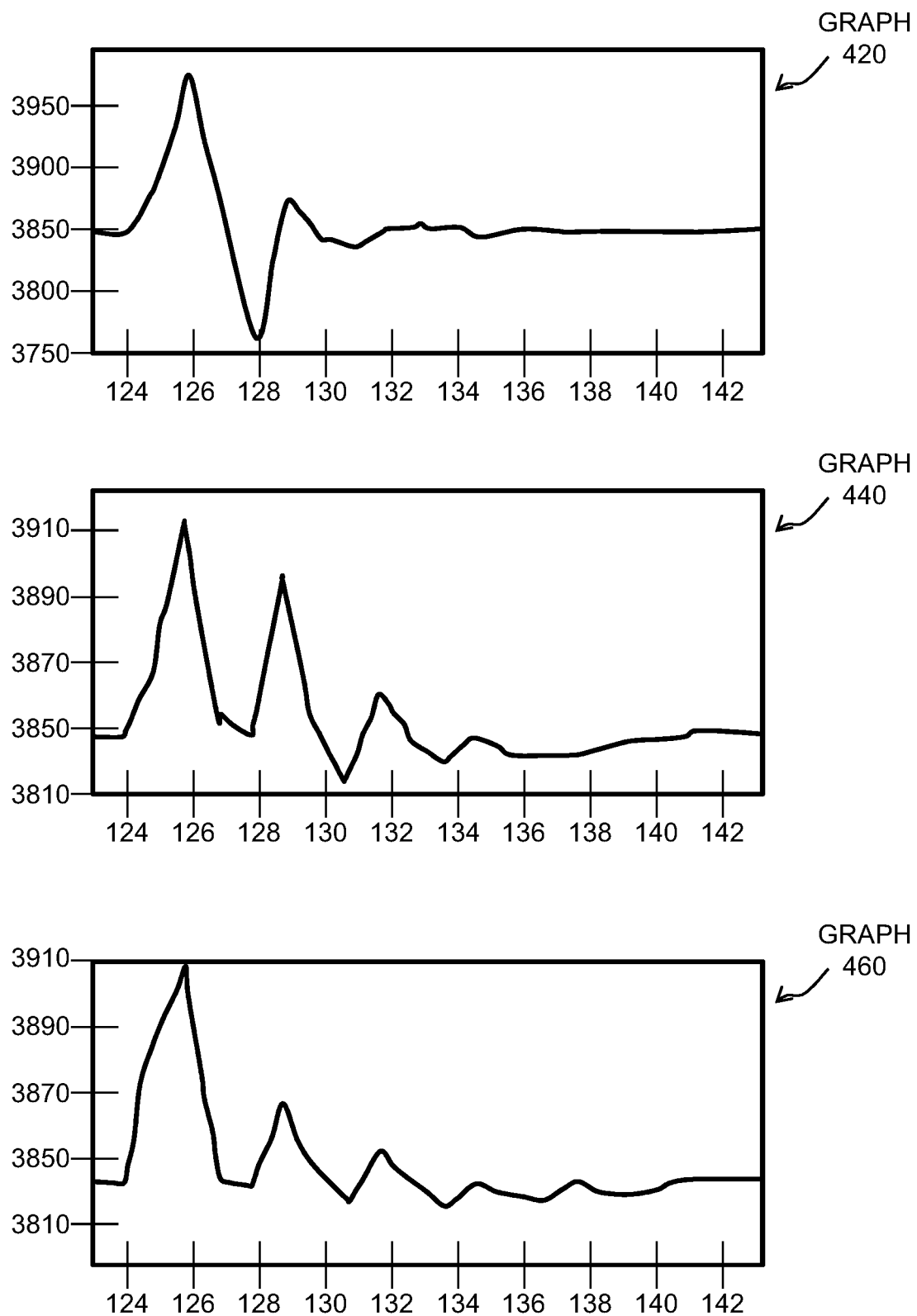
FIG. 4 shows graphs depicting impulse responses caused by changes in operation frequencies as determined by a power receiver of a system for different loads on the power receiver in accordance with one or more embodiments.

Turning now to FIG. 4, graphs 420, 440, and 460 depict impulse responses caused by changes in operation frequencies as determined by the Rx 102 for different loads on the Rx. In each graph 420, 440, and 460, the x-axis shows a number of carrier cycles, and the y-axis represents an operation frequency (e.g., expressed as a measure the number of clocks cycles, such as for a 480 MHz clock). In graph 420, a change in the operation frequency (e.g., an impulse response of load R=200 ohms) occurs at carrier cycle 124, which causes a ripple through multiple carrier cycles. Similarly, in graph 440, a change in the operation frequency (e.g., an impulse response of load R=50 ohms) occurs at carrier cycle 124 that causes a ripple through multiple carrier cycles; and in graph 460, a change in the operation frequency (e.g., an impulse response of R=10 ohms) at carrier cycle 124. Given the graphs 420, 440, and 460, in accordance with one or more embodiments, the actual speed of transfer may be selected based on the impulse response. The Tx 101 can send the training pulse (or pulses), and the Rx 102 can determine an optimal data rate possible based on the response and can notify the Tx 101 of the optimal data rate possible (i.e., how many cycles each bit is modulated on). The Tx 101 can then use the optimal data rate possible to modulate the data.

As an example given the responses for impulse shown in graphs 420, 440, 460, the Rx can select a rate of 1 (e.g., each bit is coded on one cycle) for an impulse response of load of 10 ohm, but a rate of 2 (e.g., two cycles per bit) for the impulse response of higher loads (e.g., 50 ohm and 200 ohm) as the first delta is not the largest (e.g., in both cases the second is the largest). Note that, is some case, the FIR can be used to cancel this affect such that the Tx 101 can send data at a single cycle per bit even for the higher loads. When a lower rate of N is selected, the interval sampling is performed every N cycles. The Rx 102 may use different criteria in regards to the impulse response to select the rate, such as the length of impulse response, relative amplitude of samples of the impulse response, etc.

According to one or more embodiments, in the Rx 102, intervals of carrier cycles are monitored such that the intervals of previous bits are then fed via the trained FIR response and the impulse response is subtracted from current received bit interval (e.g., this operation by the Rx 102 enables for canceling of the effect of spreading of impulse response later in the method 300). The result of the subtraction is then compared to a threshold (e.g., stored in the computer readable storage medium) to determine if a bit is a 0 or 1. In one exemplary implementation, a '0' bit is coded by keeping the carrier frequency at its standard operation frequency, and '1' bit is coded as an increase of frequency by 3 kHz. Note that other coding techniques can be used by the system 100, such as a bi-phase (or other) coding to keep the DC root mean square (RMS) low.

For example, T(n) includes monitored time intervals between peaks or zero crossings. FIR(n) includes coefficients of equalizing filter. Out(n) includes processed intervals after equalization and normalization. Data(n) includes reconstructed data. Scale includes a normalization factor. During training, Equations 1 and 2 are applied within the digital signal processing of the controller 135.

$$\text{Scale} = T(1) \qquad \text{Equation 1}$$

$$FIR(n) = T(n+1) - T(0) \text{ for } n=1 \ldots 6 \qquad \text{Equation 2}$$

At block 330, the Rx 102 determines the impulse response based on the detected the training sequence (e.g., pulse or pulses). The Rx 102 uses intervals measurements to configure a FIR equalizer of N taps. Note that FIR equalizer exists in firmware of the controller 135 as described herein. According to one embodiment, the FIR includes 16 taps. Note, the system 102 in this stage is overcoming limitations for true high speed data, as the impulse response of the system 100 extends well beyond a single bit period. Further, the impulse response is not fixed and changes according to a coupling of the Rx 102 and the Tx 101, a Tx Q factor (e.g., a higher system Q factor leads to longer impulse response), and a load.

A reference simulation embodiment for detecting the impulse response is described, where a simulation of impulse response to a particular pulse of carrier frequency is used. The simulated impulse response for a single cycle of F=F0+ΔF is measured (ΔF=3 kHz). The intervals between current peaks on the resonance circuit of the Rx 102 are simulated (e.g., in 2 ns resolution). The Tx 101 and the Rx 102 are simulated with 12 uH coils, and resonance circuit tuned to 100 kHz. Coupling is selected as 0.45. Simulation for different load conditions on the Rx 102 are performed.

At block 340, the Tx 101 transmits data (e.g., one or more data packets). In an embodiment, a transmission of a Control Error 0 message from the Rx 102 to the Tx 101 can be used as a trigger for the Tx 101 to send a data packet. The data can be coded as FM modulation. Each bit can be coded over one or more cycles of the carrier. In an example, the data rate can be set to a bit for two carrier cycles (for instance, if at some point the impulse response is so long or too complex, the Tx 101 can send the bit over 2 or 4 cycles). Data, in general, can be a relatively large quantity with respect to current wireless power transfer methods. In this regard, the data can include authentication credentials, control data, firmware configurations or updates, or the like (e.g., once a robust communication channel is established, any relevant data can be transmitted, such as MP3 audio files, web pages, etc.).

The data and/or data packet can include 10s of bytes or 100s of bytes, such as to meet the demands of a consumer and/or industrial market (and further 5G communication systems and military systems). According to one or more embodiments, a data packet can be composed of 16 bit preamble with a 2 byte header. The 2 byte header can include a type of packet, a serial number of current sent packet, a serial number of last acknowledged packet, and a packet length. The preamble can further include two identical sequences of 8 bits coding the byte 0b10000000. Each of the two bytes can be used to train the FIR of the Rx 102 (e.g., FIR length is <8). Further, N bytes of data and 2 bytes of checksum or CRC can be at the end of the packet. Note that data can be transferred in addition to power. Note also, that the data is not distorted upon sending. Due to the higher Tx data transfer rate of the system 100, an inherent echo (e.g., an impulse response) fluctuates between the Tx and Rx to distort the transmitted data.

According to another embodiment, if there is no synchronization between Tx 101 and Rx 102 on the cycle at which the bit begins, then there is ambiguity on the reception (e.g., if a current carrier cycle is a start of a new bit or is a middle of previous bit). The initial 8 bit preamble is used to verify what is the correct offset. If a channel distortion is not extremely high, a response would show a high value sample followed by a sample with lower value if the synchronization of bit is correct, or almost identical first and second sample if it is not correctly synchronized. If incorrect synchronization is detected, the Rx 102 changes a sampling phase to a correct timing and the second 8 bit preamble is be received with the correct timing and used to train the FIR.

At block 350, the Rx 102 cancels effects of the impulse response on the data (e.g., distorted data). For example, the controller 135 performs digital signal processing on the distorted data received through the in-band communication, using the impulse response determined from the training sequence, to remove the effect of the impulse response on the data. Note that canceling, by the controller 135, is performed on the frequency rather than in the time domain (though the latter is possible for the controller).

At block 370, the Rx 102 outputs/produces clean data from distorted data, in accordance with digitally canceling the effects of the impulse responses. According to one or more embodiments, during data transfer, Equations 3 and 4 are applied within the digital signal processing of the controller 135.

$$\text{Out}(n) = \frac{\left(T(n) - T(0) - \sum_{1}^{16} FIR(k) * \text{Data}(n-k)\right)}{\text{Scale}} \quad \text{Equation 3}$$

$$\text{Data}(n) = \text{Out}(n) > 0.5 \quad \text{Equation 4}$$

According to one or more embodiments, additional mechanisms of framing the bits into bytes or packets can be utilized, as well as error detection mechanisms (e.g., parity bits or CRC). In some embodiments, an addition of error correction methods (e.g., such as RS codes) can be provided for each block of data. Further, a retry mechanism can be implemented by the Rx 102, where the Rx 102 acknowledges receipt of each packet and the Tx 101 retries transmission of a packet that has not been acknowledged properly. Furthermore, a feedback mechanism can be implemented from the Rx 102 to the Tx 101 to enable the Tx 101 to dynamically change a rate of transmission based on impulse response.

According to one or more embodiments, a bit length of the data packet can be 512 carrier cycles (though the system 100 is capable of 1 or 2 cycle speeds). According to one or more advantages, technical effects, and benefits, the system 100 can cut a transmission bit length to a 128 kbPS speed to provide far better user experience for authentication, and also open up opportunities for new applications.

In view of FIG. 3, a reference simulation embodiment is described where a single training pulse from Tx 101 (block 305) is used to train (blocks 310, 315, and 330) a 16 tap FIR equalizer on the Rx 102. Note that multiple training pulses can be used to improve training. Then, 100 bits of data are then sent (block 340) from the Tx 101 using FM modulation of single cycle per bit. On the RX 102, the FIR equalizer (blocks 350 and 370) is then used to equalize incoming interval measurements. A threshold of 0.5 is then used to determine the bit value. Data is compared to actual sent data. Bit error rate (BER) of 0 achieved for all loads simulated. In this regard, turning now to FIG. 5, graphs 510 and 530 are depicted in accordance with one or more embodiments. The graph 510 shows a measured carrier peak intervals for the 100 cycles of data as measured by the Rx 102 (e.g., 100 data bit response, R=10 ohms). The graph 530 (e.g., 100 data bit equalized Rx data vs. Tx data) shows a plurality of solid dots that represent equalized results of the intervals after applying the FIR filter response and normalization to impulse response first coefficient. Further, the dashed dots of graph 530 represent the results after thresholding at 0.5. Note that the obtained bits are identical to the ones actually transmitted by the Tx 101, and the simulation described herein has 0 BER.

In some scenarios, the first interval delta for impulse response may not be the largest (i.e. the difference between T(n)–T(n–1)). In these cases, the above equalization scheme of the reference simulation embodiment may not be the optimal one. In turn, the FIR can be configured to capture the interval deltas for the cycle following the largest interval, and the scale factor can be set to the largest delta interval and not the first one.

According to one or more embodiments, an actual speed of transfer may be selected based on the impulse response. The Tx 101 can send the training sequence (e.g., pulse or pulses). The Rx 102 can determine based on the impulse response an optimal data rate possible and notify the Tx 101 what it should be (e.g., how many cycles each bit is modulated on). The Tx can then use the defined rate to modulate the data. In this way, a feedback mechanism is implemented from the Rx 102 to the Tx 101 to enable the Tx 101 to dynamically change a rate of transmission based on impulse response.

As noted herein, a similar approach to method 200 can be extended to support an increase in a data rate of transmissions from the Rx 102 to the Tx 101. Thus, in the case of the Rx 102 transmissions, modulation can be based on load modulation achieved by connection of the ancillary load 125 to the receiver resonance circuit or in parallel to the load 105. In turn, in the Tx 101, the monitored value can be a voltage or current amplitude or voltage or current phase on primary coil or resonance capacitor (or a combination thereof, of the power transmitter). The similar approach of training and equalization (blocks 301, 330, and 350) can be used, but based on analysis of the measured voltage/current amplitude or phase. This approach would require to have the bit modulation being synchronized to the carrier cycles as opposed to current receiver transmissions that have fixed bit length and are asynchronous to the power carrier. The Rx 102 can extract the carrier frequency based on analysis of resonance circuit components voltage or current peeks of zero crossings and then synchronize its transmission accordingly.

According to one or more embodiments, an additional messaging performed at the existing low speed modulation can be used to negotiate an ability to support fast data rate transmission between the Tx 101 and the Rx 102 and a time of switch between low rate asynchronous transmissions to the faster synchronous transmission. Note that the negotiation can include a range of rates supported by the Rx 102 and the Tx 101.

Figure 6:
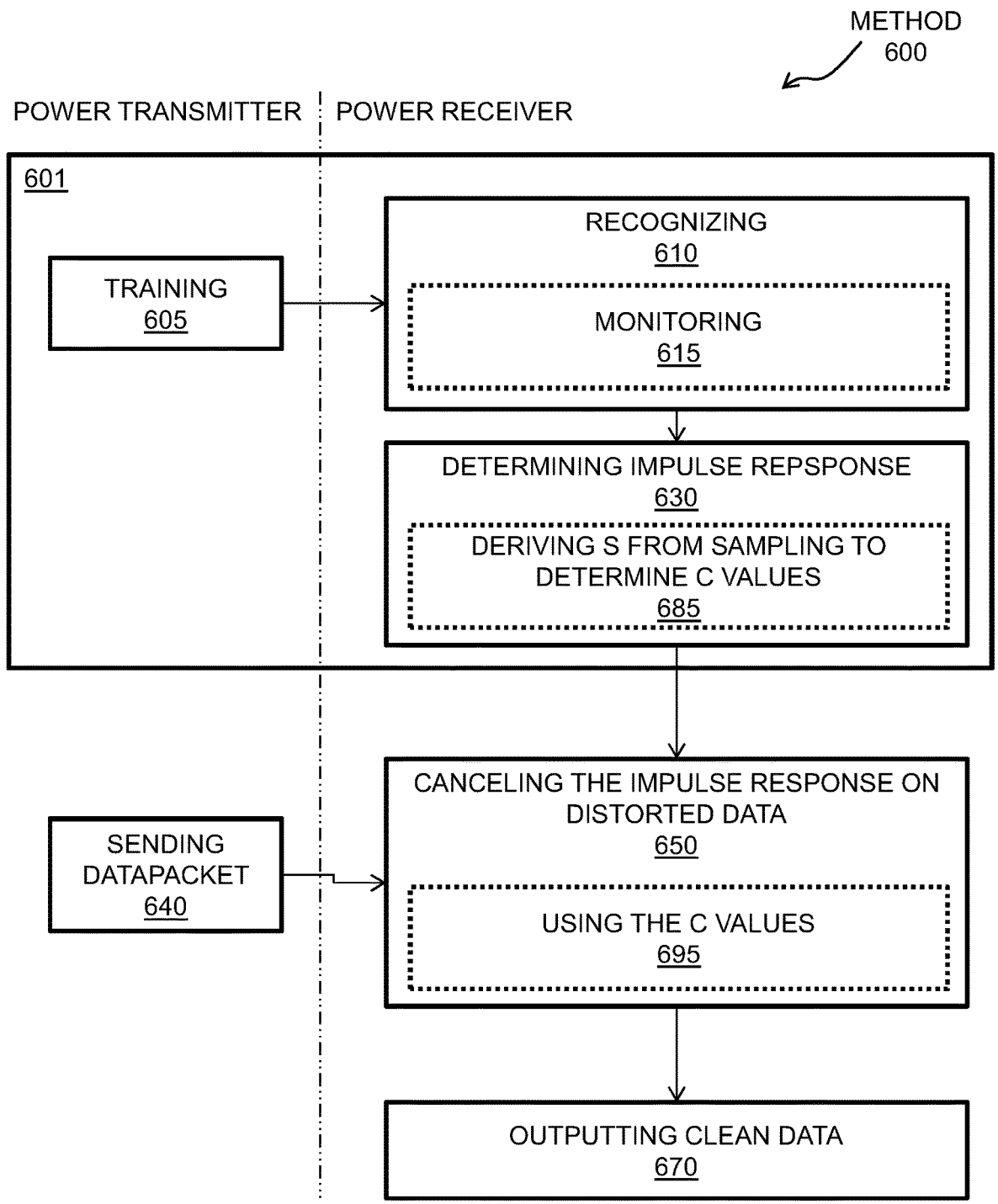
FIG. 6 depicts a method of a system in accordance with one or more embodiments.

Turning now to FIG. 6, an example operation of a method 600 of a system (e.g., the system 100 of FIG. 1) is depicted in accordance with one or more embodiments. The method 600 can be executed by the Rx 102 and the Tx 101 after the Rx 102 is presented to the Tx 101 in the space around the Tx 101, such that at least in-band communications of data at higher bit rates begins. As those in FIG. 6, some operations of the method 600 are executed by the Tx 101, which others are executed by the Rx 102.

The method 600 begins at block 601, according to an alternative training embodiment that includes the Tx 101 transmitting (block 605) a training sequence with a data packet, the Rx 102 recognizing (block 610) a change in frequency (in the in-band communications) that identifies the training sequence by monitoring (block 615) a carrier cycle length, and the Rx 102 determining (block 630) the impulse response based on the detected the training sequence (e.g., pulse or pulses). Then the Rx 102 cancels (block 650) the effects of the impulse response on the data (e.g., distorted data) and outputs/produces (block 670) clean data from distorted data, in accordance with digitally canceling the effects of the impulse responses.

On an exemplary implementation of block 601, the Tx 101 uses control error packets with value of 0 received from the Rx 102 as a trigger for sending the transmission to the Rx 102. In another embodiment, a dedicated packet can be used. Each packet can include a fixed preamble that is used for training the equalizer of the Rx 102. According to one or more embodiments, the training sequence can include a single '1' transmitted bit followed by a fixed number of '0' bits (7 bits as an example), and training sequence can be transmitted more than one time. In an exemplary implementation it is transmitted twice.

Further, the training sequence can be followed by data (e.g., one or more data packets sent by the Tx 101, at block 640). For example, data can be a data packet of 8 bits of length followed by N bytes of data and a single or dual checksum/CRC byte/s. Note that transmission of single bit of data can be performed over a single carrier cycle or more using frequency modulation, where the modulation depth is selected as to not to create significant modification to the power transfer. As described herein, the modulation depth can be selected as 3 kHz. In this regard, '0' bits are sent as unmodulated carrier as the original operation point frequency, while '1' bits are transmitted as modulated carrier at a frequency 3 kHz higher than the original frequency. The Rx 102 is 'ready' to accept incoming packets based on its transmission of the trigger packet (e.g., control error with 0 value or other) and synchronizes on the first bit of a synchronization pattern being '1'.

If the bit is sent over more than a single carrier cycle (assuming N cycles) and the Rx 102 is sampling the duration of carrier cycles in resolution of N cycles as well, then a synchronization of timing of start of bit between the Tx 101 and the Rx 102 is required to align the Rx 102 sampling to the bit modulation of the Tx 101. Note that the Rx 102 can deduct the offset that the Rx 102 has in view of the Tx 101 timing based on the decoding of the initial training sequence. The following section provides an example of the effect of lack of such synchronization and the ways to resolve it.

Figure 7:
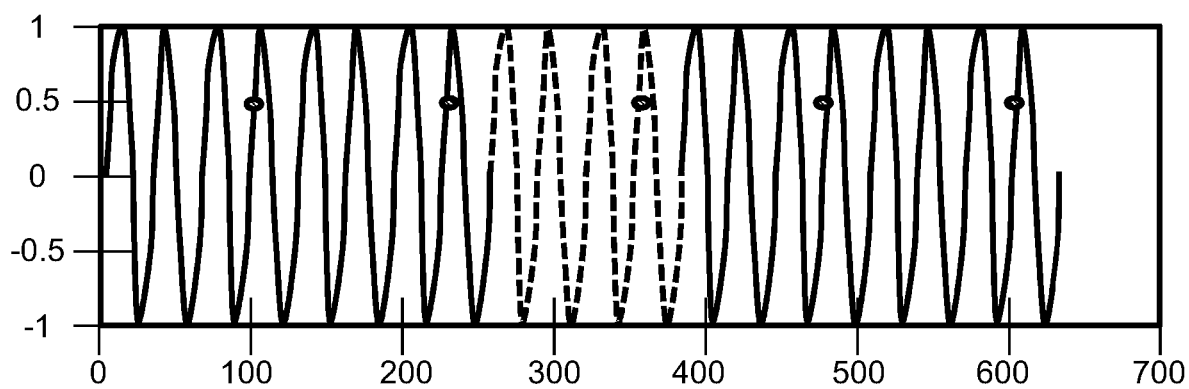
FIG. 7 shows a graph depicting data received by a power receiver of a system in accordance with one or more embodiments.

According to one or more embodiments, if the Tx modulation uses 4 cycles of the operating frequency for each bit (e.g., bit '0' is sent as 4 cycles of carrier frequency 125 kHz, and bit '1' is sent as 4 carrier cycles of frequency 128 kHz) and causes a time difference of 0.75 μsec between a '0' and a '1' bit duration, and the Rx 102 uses an initial timing that is not synchronized with the Tx in sampling a change of 0.563 for a first bit followed by 0.187 μsec for the second bit, then the Rx 102 can deduce that an early time shift by 1 cycle is currently in effect. The Rx 102 can, therefore, modify the sampling timing to align with the transmission by the Tx 101, and receive the second training sequence with correct timing. The second training sequence may be used to train the equalizer (FIR) of the Rx 102 for decoding the rest of the data bits. As shown in FIG. 7, in accordance with one or more embodiments, a graph 700 depicts the '0' bit modulation in the solid line, the '1' bit modulation in the dashed-line, and the interval sampling point before each synchronization as a circle.

Returning to FIG. 6, with respect to the Rx 102 determining the impulse response at block 630, the default interval can be established before the reception of the first '1' bit of the synchronization pattern. The first interval measured after the start of '1' bit transmission includes 3 cycles of the '1' bit, and the measured interval is therefore ~0.563 μsec shorter than the default measured interval, with the second interval following to include one cycle of the '1' bit (e.g., which would therefore be shorter by ~0.187 μsec from the default interval). Note that the default interval can be measured immediately after an end of transmission of the trigger packet from Rx 102 (i.e., in the example herein, the Control Error 0). The Tx 101, then, sends transmissions at some defined short delay after end of received trigger packet. If the frequency is measured in this delay period it is guaranteed to represent the unmodulated frequency.

Further, as the Tx 101 and the Rx 102 may not include only linear components, the overall response of the system 100 may not be entirely linear. Discussed herein is an equalization technique that assumes close to linear response and uses training of a FIR based on the training sequence of impulse response to implement a match filter for the modulated data. An alternative embodiment, the system 100 can assume some non-linearity of the impulse response within a limited time span, such as with a rectification bridge effect (e.g., response received is affected by limited number of bits transmitted previously).

Thus, assuming the impulse response is limited to N bits of data, a training sequence can be selected by the Tx 101 to include all the 2^N combinations of the N bits. This may be achieved by using an output of an N bit linear-feedback shift register (LFSR) with a maximal cycle of 2^N−1. The all 0 combination is provided by the initial bits before the start of the training sequence. An example of a training sequence for N=5 is provided as "00000100101100111110001101110101010000".

In turn, at block 685, the Rx 102 then collects all the impulse responses S(D) for the different 5 bit combinations of last 5 received bits (D(n)−D(n−N−1)), where the impulse responses are the time intervals of the bit as measured by the Rx 102. FIG. 8 depicts a table 800 in accordance with one or more embodiments. The table 800 provides an example of collection of data relating to the above training sequence (e.g., sampled data and stored S values). The location D in the table can be the value composed of the N last received bits were least significant bit (LSB) is the last bit value.

The controller 135 then determines correction values C(X) were X is a N−1 bit index, as shown by equation 5.

$$C(X)=(S(2X+1)+S(S))/2 \qquad \text{Equation 5}$$

For instance, FIG. 9 depicts a table 900 in accordance with one or more embodiments. The table 900 provides processed C values and C-Threshold values used for hard decisions.

At block 695, the correction values C(X) are used as the threshold for decision between a 0 and a 1 bit when last N−1 are the value of X. In this regard, the method 600 normalizes the received samples and performs a dedicated equalization per each received N bits sequence.

According to one or more advantages, technical effects, and benefits, the system 100 (in view of the methods 200, 300, and 600) is effective for a linear system and provides similar results to the FIR based equalizer of N taps for a linear system. Further, the system 100 (in view of the methods 200, 300, and 600) has the advantage of lowering the computation efforts required by the controller 135 of the Rx 102 as the multiple multiply summation operations of the FIR are replaced by simple lookup in a table (e.g., the table 900). In this regard, the system 100 (in view of the methods 200, 300, and 600) provides a straight forward implementation in a microcontroller, thereby revoking the need for a special digital signal processing unit in the Rx 102 (e.g., for demodulation of the fast in-band communication coming from the Tx 101).

According to one or more embodiments, the methods described herein can be combined. For instance, an initial simple impulse response training is used to determine the length of the impulse response and possible timing offsets and where the second training sequence is using an N bit length as determined by the receiver and communicated to transmitter. The Rx 102 can also signal the Tx 101, if such a second training sequence is needed.

According to one or more embodiments, the initial training sequence can used to determine a number of cycles to use per bit (e.g., and therefore data rate). The initial training sequence can send using a fixed low number of cycles (as an example single cycle per bit). The Rx 102 analyzes the impulse response to the initial training sequence and then informs the Tx 101 of the number of cycles to use per bit. The Rx 103 can determine the number of cycles based on the received response distribution and/or its computation capabilities. The modification of number of cycles per bit can be performed periodically or per need during operation. The Rx 102 can inform the Tx 101 of the number of cycles per bit to use from that point on for transmissions.

According to one or more embodiments, the number of cycles per bit is negotiated between the Tx 101 and the Rx 102.

According to one or more embodiments, the Rx 102 can inform the Tx 101 that the impulse response is distributed over larger number of bit cycles then desired, the Tx 101 can then modify the transmission frequency to reduce the distribution of the impulse response. The spread of the impulse response is extended when the Tx 101 and the Rx 102 are operating closer to a joint resonance point and when system load 105 is lower. The Tx 101 can therefore modify the operation frequency to increase the gap from joint resonance frequency and reduce an impulse response spread. The Tx 102 and the Rx 102 may also set the operational point to have a significant gap (as an example a gap of over 30 kHz) from the couple joint resonance point. For that purpose, the Rx 102 can control the load 105 and requested rectified voltage during the fast data exchange period.

According to one or more embodiments, the Rx 102 can initiate fast data transmission from the Tx 101 in the period of time after identification and configuration (and possibly negotiation and calibration) and before power transfer phase when the load 105 is still not enabled. According to one or more advantages, technical effects, and benefits, initiating the fast data transmission by the system 100 specifically beneficial for completion of fast authentication exchanges between the Tx 101 and the Rx 102, such that a full authentication process can be completed in less than 100 msec. The initial training sequence may be sent once per connection session between the Tx 101 or the Rx 102 or per defined number of transferred packet or duration of time. The second training sequence at the agreed cycles per bit may be sent prior to each packet or other defined interval.

As indicated herein, embodiments disclosed herein may include apparatuses, systems, methods, and/or computer program products at any possible technical detail level of integration. The computer program product may include a computer readable storage medium (or media) having computer readable program instructions thereon for causing a controller to carry out aspects of the present invention.

Figure 10:
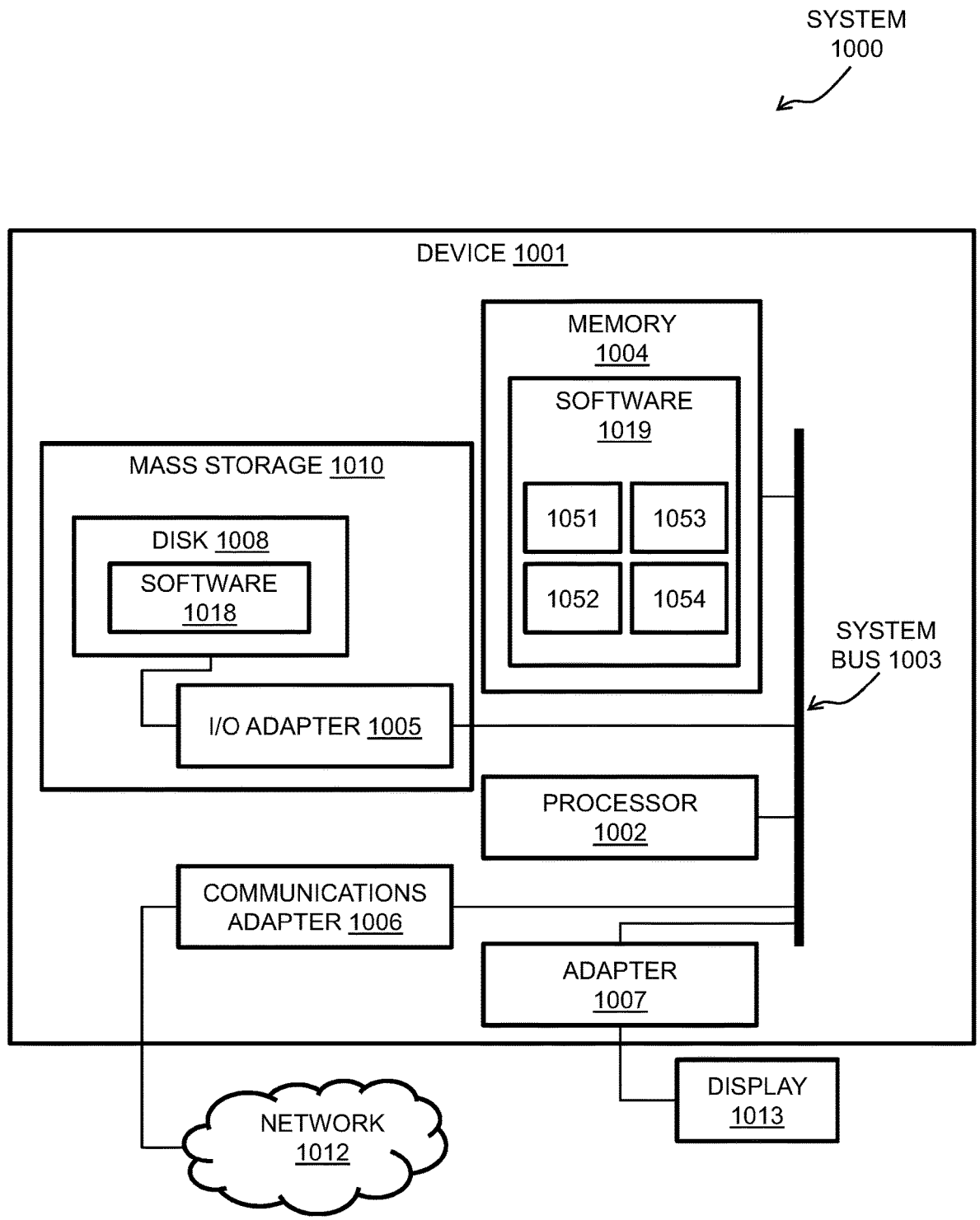
FIG. 10 shows a block diagram depicting a system in accordance with one or more embodiments.

For instance, FIG. 10 depicts an example of a system 1000 in accordance with one or more embodiments. The system 1000 has a device 1001 (e.g., the Rx 102 and/or the Tx 101 of the system 100 of FIG. 1) with one or more central processing units (CPU(s)), which are collectively or generically referred to as processor(s) 1002 (e.g., the controller 135 of FIG. 1). The processors 1002, also referred to as processing circuits, are coupled via a system bus 1003 to system memory 1004 and various other components. The system memory 1004 can include a read only memory (ROM), a random access memory (RAM), internal or external Flash memory, embedded static-RAM (SRAM), and/or any other volatile or non-volatile memory. For example, the ROM is coupled to the system bus and may include a basic input/output system (BIOS), which controls certain basic functions of the device 1001, and the RAM is read-write memory coupled to the system bus 1003 for use by the processors 1002.

FIG. 10 further depicts an input/output (I/O) adapter 1005, a communications adapter 1006, and an adapter 1007 coupled to the system bus 1003. The I/O adapter 1005 may be a small computer system interface (SCSI) adapter that communicates with a drive and/or any other similar component. The communications adapter 1006 interconnects the system bus 1003 with a network 1012, which may be an outside network (power or otherwise), enabling the device 1001 to communicate data and/or transfer power with other such devices (e.g., such as the Tx 101 connecting to the Rx 102). A display 1013 (e.g., screen, a display monitor) is connected to the system bus 1003 by the adapter 1007, which may include a graphics controller to improve the performance of graphics intensive applications and a video controller. Additional input/output devices cab connected to the system bus 1003 via the adapter 1007, such as a mouse, a touch screen, a keypad, a camera, a speaker, etc.

In one embodiment, the adapters 1005, 1006, and 1007 may be connected to one or more I/O buses that are connected to the system bus 1003 via an intermediate bus bridge. Suitable I/O buses for connecting peripheral devices such as hard disk controllers, network adapters, and graphics adapters typically include common protocols, such as the Peripheral Component Interconnect (PCI).

The system memory 1004 is an example of a computer readable storage medium, where software 1019 can be stored as instructions for execution by the processor 1002 to cause the device 1001 to operate, such as is described herein with reference to FIGS. 2-3 and 6. In connection with FIG. 1, the software 1019 can be representative of firmware 159 for the Rx 102, such that the memory 1004 and the processor 1002 (e.g., the controller 135) logically provide a FIR equalizer 1051, a detector of training sequence 1052 (e.g., loads data to the FIR equalizer), an analyzer of training sequence 1053 (e.g., that processes data), and an impulse response canceler 1054 (e.g., uses the FIR data to perform the canceling).

The computer readable storage medium can be a tangible device that can retain and store computer readable program instructions. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions described herein can be communicated and/or downloaded to respective controllers from an apparatus, device, computer, or external storage via a connection, for example, in-band communication. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In accordance with the disclosure herein, one or more embodiments include a power receiver. The power receiver executes in-band communication with a power transmitter. The power receiver is configured to recognize a change in frequency that identifies a training sequence; determine an impulse response with respect to the training sequence; and cancel an effect of the impulse response during the in-band communication.

In accordance with the above power receiver embodiment, the power receiver can be configured to monitor the in-band communication to detect an interval between peaks or a defined level of voltage of a capacitor of the power receiver or an inductor of the power receiver that correspond to the change in frequency.

In accordance with any of the above power receiver embodiments, the power receiver can be configured to dynamically determine one or more impulse responses corresponding to one or more data packets received after the training sequence.

In accordance with any of the above power receiver embodiments, the power receiver can be configured to cancel the effect of each of the one or more impulse responses with respect to one or more distorted data packets.

In accordance with any of the above power receiver embodiments, the training sequence can be known to the power receiver.

In accordance with any of the above power receiver embodiments, the change in the frequency that identifies the training sequence can include sending a training pulse, as the training sequence, that is composed of a single carrier cycle at a frequency that is at least 3 kHz higher than an operating frequency.

In accordance with any of the above power receiver embodiments, the power receiver can be configured to provide at least one packet to the power transmitter to trigger the change in the frequency and the training sequence.

In accordance with any of the above power receiver embodiments, the at least one packet can include a control error packet.

In accordance with any of the above power receiver embodiments, the at least one packet can include a dedicated packet with a fixed preamble.

In accordance with any of the above power receiver embodiments, the power receiver can be configured to determine a default interval before a reception of a first bit of a synchronization pattern.

In accordance with any of the above power receiver embodiments, the training sequence can include all $2^N$ combinations of the N bits.

In accordance with any of the above power receiver embodiments, the power receiver can be configured to collect one or more impulse responses for different bit combinations, determine correction values, and utilize the correction values as a threshold for decision for canceling the effect of the impulse response.

In accordance with any of the above power receiver embodiments, a system can include the power transmitter and the power receiver.

In accordance with any of the above power receiver embodiments, the system can include one or more non-linear components.

In accordance with any of the above power receiver embodiments, the in-band communication can include one or more data packets, each comprising a bit length extending at least over 1 or 2 cycle speeds.

In accordance with any of the above power receiver embodiments, the in-band communication can include one or more data packets communicating authentication credentials, control data, or firmware configurations.

In accordance with the disclosure herein, one or more embodiments include a power transmitter. The power transmitter executes in-band communication with a power receiver. The power transmitter is configured to recognize a change in frequency that identifies a training sequence; determine an impulse response with respect to the training sequence; and cancel an effect of the impulse response during the in-band communication.

In accordance with the above power transmitter embodiment, the change in frequency can include a modulation based on load modulation achieved by connection of an ancillary load to receiver resonance circuit or in parallel to a load of the power receiver.

In accordance with any of the above power transmitter embodiments, the power transmitter can be configured to monitor the in-band communication to detect a value change with respect to a voltage or current amplitude or voltage or current phase on a primary coil or on a resonance capacitor of the power transmitter.

In accordance with any of the above power transmitter embodiments, a system can include the power transmitter and the power receiver.

The flowchart and block diagrams in the drawings illustrate the architecture, functionality, and operation of possible implementations of apparatuses, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the flowchart and block diagrams in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A power receiver executing in-band communication with a power transmitter, the power receiver configured to:
   recognize a change in frequency that identifies a training sequence;
   determine an impulse response with respect to the training sequence; and
   cancel an effect of the impulse response during the in-band communication,
   wherein the power receiver is configured to monitor the in-band communication to detect an interval between peaks or a defined level of voltage of a capacitor of the power receiver or an inductor of the power receiver that correspond to the change in frequency.

2. The power receiver of claim 1, wherein the training sequence is known to the power receiver.

3. The power receiver of claim 1, wherein the change in the frequency that identifies the training sequence comprises sending a training pulse, as the training sequence, that is composed of a single carrier cycle at a frequency that is at least 3 kHz higher than an operating frequency of the power receiver.

4. The power receiver of claim 1, wherein the training sequence comprises all 2^N combinations of N of the N bits.

5. The power receiver of claim 1, wherein a system comprises the power transmitter and the power receiver.

6. The power receiver of claim 5, wherein the system comprises one or more non-linear components.

7. The power receiver of claim 1, wherein the in-band communication comprises one or more data packets, each comprising a bit length extending at least over one cycle speed.

8. The power receiver of claim 1, wherein the in-band communication comprises one or more data packets communicating authentication credentials, control data, or firmware configurations.

9. A power receiver executing in-band communication with a power transmitter, the power receiver configured to:
   recognize a change in frequency that identifies a training sequence;
   determine an impulse response with respect to the training sequence; and
   cancel an effect of the impulse response during the in-band communication, herein the power receiver is configured to dynamically determine one or more impulse responses corresponding to one or more data packets received after the training sequence.

10. The power receiver of claim 9, wherein the power receiver is configured to cancel the effect of each of the one or more impulse responses with respect to one or more distorted data packets.

11. A power receiver executing in-band communication with a power transmitter, the power receiver configured to:
    recognize a change in frequency that identifies a training sequence;
    determine an impulse response with respect to the training sequence; and
    cancel an effect of the impulse response during the in-band communication,
    wherein the power receiver is configured to provide at least one packet to the power transmitter to trigger the change in the frequency and the training sequence.

12. The power receiver of claim 11, wherein the at least one packet comprises a control error packet.

13. The power receiver of claim 11, wherein the at least one packet comprises a dedicated packet with a fixed preamble.

14. A power receiver executing in-band communication with a power transmitter, the power receiver configured to:
    recognize a change in frequency that identifies a training sequence;
    determine an impulse response with respect to the training sequence; and
    cancel an effect of the impulse response during the in-band communication,
    wherein the power receiver is configured to determine a default interval before a reception of a first bit of a synchronization pattern.

15. A power receiver executing in-band communication with a power transmitter, the power receiver configured to:
    recognize a change in frequency that identifies a training sequence;
    determine an impulse response with respect to the training sequence; and
    cancel an effect of the impulse response during the in-band communication,
    wherein the power receiver is configured to collect one or more impulse responses for different bit combinations, determine correction values, and utilize the correction values as a threshold for decision for canceling the effect of the impulse response.

16. A power transmitter executing in-band communication with a power receiver, the power transmitter configured to:
    recognize a change in frequency that identifies a training sequence;
    determine an impulse response with respect to the training sequence; and
    cancel an effect of the impulse response during the in-band communication,
    wherein the power transmitter is configured to monitor the in-band communication to detect a value change with respect to a voltage or current amplitude or voltage or current phase on a primary coil or on a resonance capacitor of the power transmitter.

17. The power transmitter of claim 16, wherein a system comprises the power transmitter and the power receiver.

18. A power transmitter executing in-band communication with a power receiver, the power transmitter configured to:
    recognize a change in frequency that identifies a training sequence;
    determine an impulse response with respect to the training sequence; and
    cancel an effect of the impulse response during the in-band communication,
    wherein the change in frequency comprises a modulation based on load modulation achieved by connection of an ancillary load to a receiver resonance circuit or in parallel to a load of the power receiver.

* * * * *

UNITED STATES PATENT AND TRADEMARK OFFICE
CERTIFICATE OF CORRECTION

PATENT NO. : 11,381,281 B2
APPLICATION NO. : 17/165306
DATED : July 5, 2022
INVENTOR(S) : Itay Sherman et al.

It is certified that error appears in the above-identified patent and that said Letters Patent is hereby corrected as shown below:

In the Drawings

In Fig. 1, Sheet 1 of 10, for Tag "125", in Line 1, delete "ANCILLIARY" and insert
-- ANCILLARY --, therefor.
In Fig. 3, Sheet 3 of 10, and on the title page, the illustrative figure, for Step "330", in Line 2, delete "REPSPONSE" and insert -- RESPONSE --, therefor.

In the Specification

In Column 5, Line 4, delete "to the" and insert -- to --, therefor.
In Column 5, Line 57, delete "RX" and insert -- Rx --, therefor.
In Column 6, Line 28, delete "packet." and insert -- packet). --, therefor.
In Column 6, Line 29, delete "Tx 102" and insert -- Tx 101 --, therefor.
In Column 6, Line 55, delete "sated" and insert -- stated --, therefor.
In Column 6, Line 62, delete "the" and insert -- of the --, therefor.
In Column 7, Line 61, delete "system 102" and insert -- system 100 --, therefor.
In Column 8, Line 8, delete "12 uH" and insert -- 12uH --, therefor.
In Column 8, Line 57, delete "is be" and insert -- is --, therefor.
In Column 9, Line 42, delete "RX" and insert -- Rx --, therefor.
In Column 12, Line 31, delete "were" and insert -- where --, therefor.
In Column 13, Line 2, delete "can used" and insert -- can be used --, therefor.
In Column 13, Line 19, delete "then" and insert -- than --, therefor.
In Column 13, Lines 26-27, delete "Tx 102" and insert -- Tx 101 --, therefor.

Signed and Sealed this
Thirty-first Day of January, 2023

Katherine Kelly Vidal
*Director of the United States Patent and Trademark Office*